United States Patent
Yamashita et al.

[11] Patent Number: 5,441,822
[45] Date of Patent: Aug. 15, 1995

[54] ELECTRODE USED IN ELECTROCHEMICAL REACTION AND FUEL CELL USING THE SAME

[75] Inventors: Keijiro Yamashita, Yokohama; Nobukazu Suzuki, Tokyo, both of Japan

[73] Assignee: Kabushiki Kaisha Toshiba, Kawasaki, Japan

[21] Appl. No.: 366,099

[22] Filed: Dec. 29, 1994

[30] Foreign Application Priority Data

Dec. 29, 1993 [JP] Japan .................................. 5-349640

[51] Int. Cl.$^6$ ............................................. H01M 4/86
[52] U.S. Cl. .......................................... 429/34; 429/42
[58] Field of Search ................ 429/30, 34, 38, 39, 429/40, 41, 42, 44

[56] References Cited

U.S. PATENT DOCUMENTS 5,049,459  9/1991  Akagi ..................................... 429/33
5,217,821  6/1993  Landsman et al. ................ 429/42 X

FOREIGN PATENT DOCUMENTS 63-19979  4/1988  Japan .

*Primary Examiner*—Anthony Skapars
*Attorney, Agent, or Firm*—Oblon, Spivak, McClelland, Maier, & Neustadt

[57] ABSTRACT

An electrode includes a porous catalyst layer having a thickness of about 0.1 mm and a porous diffusion layer having a thickness of about 1.6 mm. The catalyst layer includes a large number of agglomerate portions and a large number of gap portions which are alternately and almost parallelly arranged in a stripe-like manner. The agglomerate portion has a porous body having a porosity of 50% or more and consisting of fine carbon powder particles on which an alloy catalyst containing platinum as a main component is dispersed and carried, and an aqueous phosphoric acid solution serving as an electrolyte held in the pores of the porous body. The gap portion is formed of a large number of water-repellent PTFE fibers having a porosity of 20% or more to connect the agglomerate portions, thereby providing an electrode of a fuel cell having a higher output density than a conventional case with the same amount of catalyst.

17 Claims, 5 Drawing Sheets

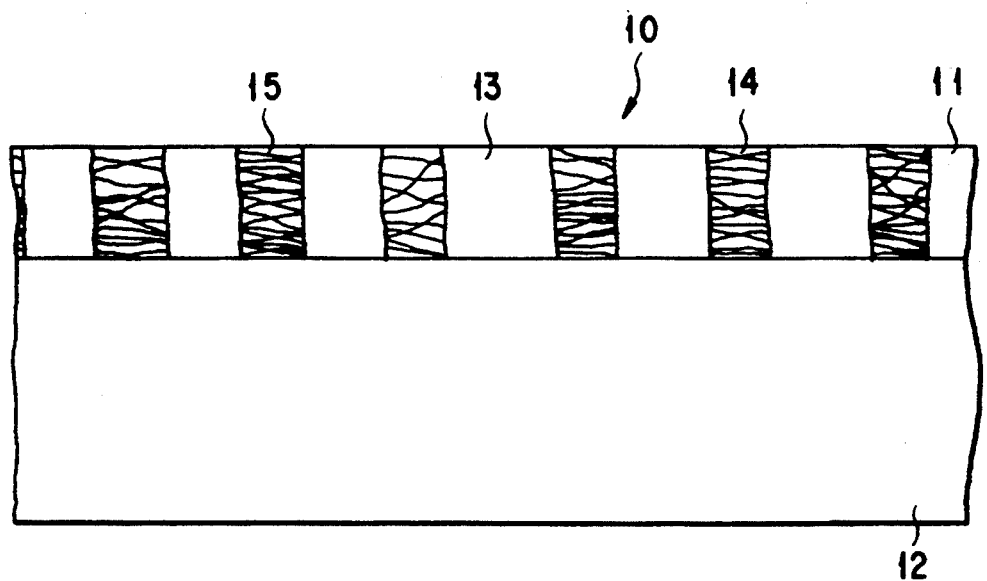
F I G. 1
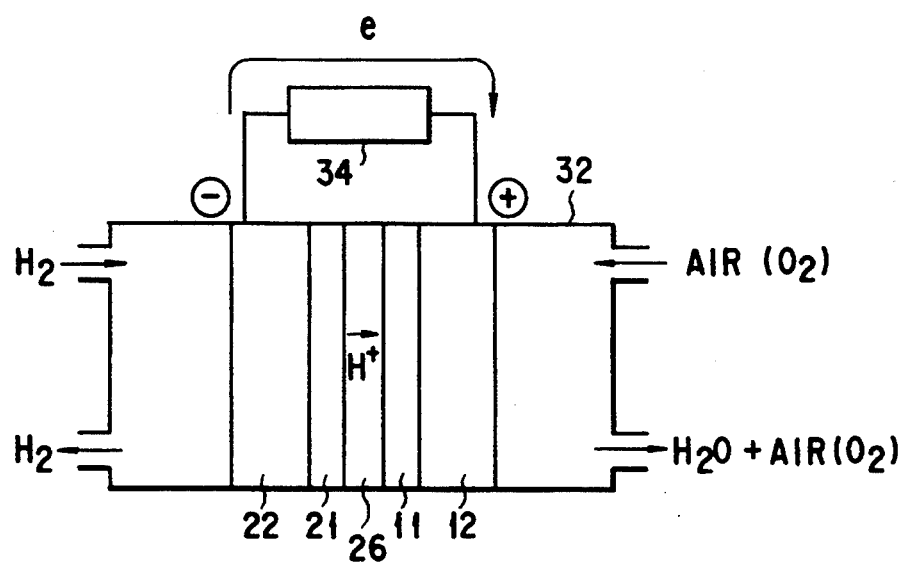
F I G. 2

ELECTRODE USED IN ELECTROCHEMICAL REACTION AND FUEL CELL USING THE SAME

BACKGROUND OF THE INVENTION

1. Field of the Invention

The present invention relates to an electrode used in an electrochemical reaction and a fuel cell using this electrode.

2. Description of the Related Art

The background of the present invention will be described with reference to a phosphoric acid fuel cell. In the phosphoric acid fuel cell, two electrodes, i.e., a flat cathode at which oxygen reacts and a flat anode at which hydrogen reacts oppose each other through an electrolyte layer. Each electrode has a two-layered structure consisting of a porous diffusion layer consisting of carbon fibers and having a thickness of about 1 to 2 mm and a porous catalyst layer formed on a surface thereof, which faces the electrolyte layer, and having a thickness of about 0.1 to 0.5 mm. A gas passage is formed in the diffusion layer or a separator adjacent to the diffusion layer. A reaction in the fuel cell takes place particularly in the catalyst layer.

When the cathode and anode of the phosphoric acid fuel cell are connected through an external circuit, reactions represented by formulas (1) and (2) below proceed in the cathode and anode, respectively. Hydrogen ions $H^+$ and electrons $e^-$ produced from hydrogen $H_2$ in the anode in accordance with formula (2) reach the cathode through the electrolyte layer and the external circuit, respectively, and react with oxygen $O_2$ to produce water $H_2O$. In this case, a flow of electrons through the external circuit, i.e., a work of a current brings on energy extraction.

$$O_2 + 4H^+ + 4e^- \rightarrow 2H_2O \quad (1)$$

$$H_2 \rightarrow 2H^+ + 2e^- \quad (2)$$

In these formulas, hydrogen ions $H^+$ and electrons $e^-$ are present in an electrolyte and a solid substance, respectively. For this reason, the reaction field is in the solid/liquid interface. The reaction speed varies depending on the types of solid substances. To obtain a practical reaction speed, a catalyst mainly consisting of a noble metal is generally required. In the phosphoric acid fuel cell, platinum or an alloy containing platinum is very popular as the catalyst. To increase the reaction area per volume, platinum or an alloy containing platinum is used such that it is granulated into a fine powder whose particle has a size of several nm to several tens of nm, and the fine powder is dispersed and carried on the surfaces of carbon powder particles in practical applications. More specifically, the reaction field is the interface between the liquid electrolyte and the fine catalyst powder in the catalyst layer, and the catalyst must be wet with the liquid electrolyte.

$O_2$ as an oxidant (reactant) appearing in formula (1) and $H_2$ as a fuel (reactant) appearing in formula (2) are diffused as gases, dissolved in the liquid electrolyte, and diffused to the surface of the catalyst in the liquid. The diffusion rates of these substances in a liquid are much lower than those in a gas. For this reason, to attain a quick reaction, the diffusion distance in the liquid must be minimized.

To satisfy this requirement, there is proposed a method of mixing polytetrafluoroethylene (PTFE) powder, which is water-repellent, and a carbon powder, which carries a dispersed hydrophilic catalyst, and using the resultant mixture as a material constituting the catalyst layer. More specifically, after the catalyst-carrying carbon powder and the PTFE powder are stirred and mixed, the surface of the diffusion layer is coated or dusted with the resultant mixture. The resultant layer is worked with a roller. To improve the dispersion degree of the PTFE powder, the worked layer is heat-treated at a temperature of about 300° C. to 390° C., thereby forming a catalyst layer on the diffusion layer.

According to the concept of this method, although the surface of the carbon powder particles which carries the dispersed catalyst becomes wet with the liquid electrolyte, the oxidant and fuel in a gaseous phase penetrate into a region in which the PTFE powder particles are combined or very close to each other, so that the diffusion distance in the liquid can be shortened. For this reason, according to the method described above, to assure a gas passage in the catalyst layer, the PTFE powder particles must be connected or very close to each other. However, the connection or the like of the PTFE powder particles is a stochastic phenomenon because the carbon and PTFE powder particles are almost uniformly distributed by stirring. To increase the probability of connection or the like between the PTFE powder particles, PTFE must be used in a large amount. In this case, some of the catalyst-carrying carbon powder particles are surrounded and isolated by or covered with the PTFE powder particles to increase the resistance to electron conduction or ionic conduction or to decrease the surface area of the catalyst, which actually contributes to the reaction. It is, therefore, difficult to obtain a high output density in the catalyst layer formed by this method.

Jpn. pat. Appln. KOKOKU Publication No. 63-19979 discloses a gas-diffusing electrode material consisting of a porous structure which has entirely continuous fine pores. The structure comprises fine knots of a PTFE resin and a large number of fine fibers of the PTFE resin, which contain no conductive material powder particle and which extend from the respective knots and three-dimensionally couple the knots to each other. According to this structure, the fine knots are partially in contact with each other or are continuous with each other. In addition, an electrolyte and/or water hardly permeate a space constituted by only the fine fibers of the PTFE resin, thereby providing a gas diffusion passage therein.

In the structure proposed by No. 63-19979 set out above, however, the problems as partial elimination of the electrolyte necessary for the reaction, coverage of the catalyst surface with the PTFE particles, and degradation of electron conductivity cannot be solved because the PTFE volume inside the fine knots undesirably increases. In addition, the moving distances of ions, electrons, and gases increase due to the three-dimensional gas diffusion passage, thereby increasing the resistance.

SUMMARY OF THE INVENTION

The present invention has been made to solve the conventional problems described above, and has as its object to provide an electrode capable of obtaining a higher output density than that in a conventional example in the same amount of catalyst as in the conventional example, and a fuel cell using this electrode.

To achieve the above object according to the present invention, the gas diffusion passage for reactants (e.g., oxygen and hydrogen in the phosphoric acid fuel cell) and/or reaction products produced by the electrochemical reaction of the reactants is clearly separated from the electrochemical reaction field.

More specifically, according to a first aspect of the present invention, there is provided an electrode to be used in an electrochemical reaction while being arranged between a gas passage for flowing a gas as a reactant and an electrolyte layer containing an electrolyte, comprising:

a diffusion layer comprising a conductive porous body in contact with the gas passage, for flowing the gas from the gas passage along a direction of thickness of the electrode; and a catalyst layer arranged between the diffusion layer and the electrolyte layer and in contact therewith; wherein the catalyst layer comprises a plurality of agglomerate portions each comprising a conductive porous body which extends in the direction of thickness of the electrode and has pores containing an electrolyte; and a plurality of gap portions arranged alternately with the agglomerate portions, each gap portion defining a bore extending through the catalyst layer in the direction of thickness of the electrode, and including in the bore a plurality of liquid-repellent fibers which connect two adjacent agglomerate portions.

According to a second aspect of the present invention, there is provided a fuel cell in which an electrochemical reaction of a gas as a reactant is used, comprising:

an electrolyte layer containing an electrolyte;

cathode and anode electrodes facing each other via the electrolyte layer, one of the electrodes comprising an electrode according to the first aspect of the present invention; and a gas passage arranged in contact with the one of the electrodes for flowing the gas.

When the electrode having the above arrangement according to the present invention is used in an electrochemical reaction, the gas flow gap portions are independent of the agglomerate portions in which the liquid electrolyte is impregnated. The rate of water repellent in the agglomerate portions is greatly reduced as compared with that in a conventional example. As a result, coverage of the catalyst and water repellency near the catalyst can be reduced, a sufficient interface area between the catalyst and the liquid electrolyte, which contributes to the reaction can be assured, and the electron conduction resistance can be reduced.

As compared with the conventional structure of a catalyst layer in which a water-repellent material and a hydrophilic catalyst are present, the gas diffusion passage can be properly assured because the gap portion for flowing the gas consists of only a water-repellent material. In addition, the water-repellent material is fibrous to enhance the water-repellent effect in a small volume as compared with a conventional example using a spherical water-repellent material, thereby improving the space efficiency in the catalyst layer.

Both the agglomerate portions and the gap portions are formed to be linearly perpendicular to the electrode surface. For this reason, the ions, electrons, and gases move across the shortest linear distances, thereby minimizing the resistance during their movement.

According to the electrode of the present invention, these various effects can provide a higher output density than a conventional example with the same amount of catalyst.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a sectional view showing an electrode according to the first embodiment of the present invention;

FIG. 2 is a schematic view of a fuel cell according to the present invention;

DETAILED DESCRIPTION OF THE PREFERRED EMBODIMENTS

The preferred embodiments of the present invention will be described with reference to the accompanying drawings.

FIG. 1 is a sectional view showing an electrode according to the first embodiment of the present invention. FIG. 1 illustrates, on the basis of an observation result with an electron microscope, an electrode for a fuel cell as an application of the electrode of the present invention, e.g., a phosphoric acid fuel cell (FIG. 3 or 4) constituted by, e.g., the diagram shown in FIG. 2. The structure of a cathode electrode is identical to that of an anode electrode, and the electrode according to the present invention will be described by using the cathode electrode as a representative.

Figure 3:
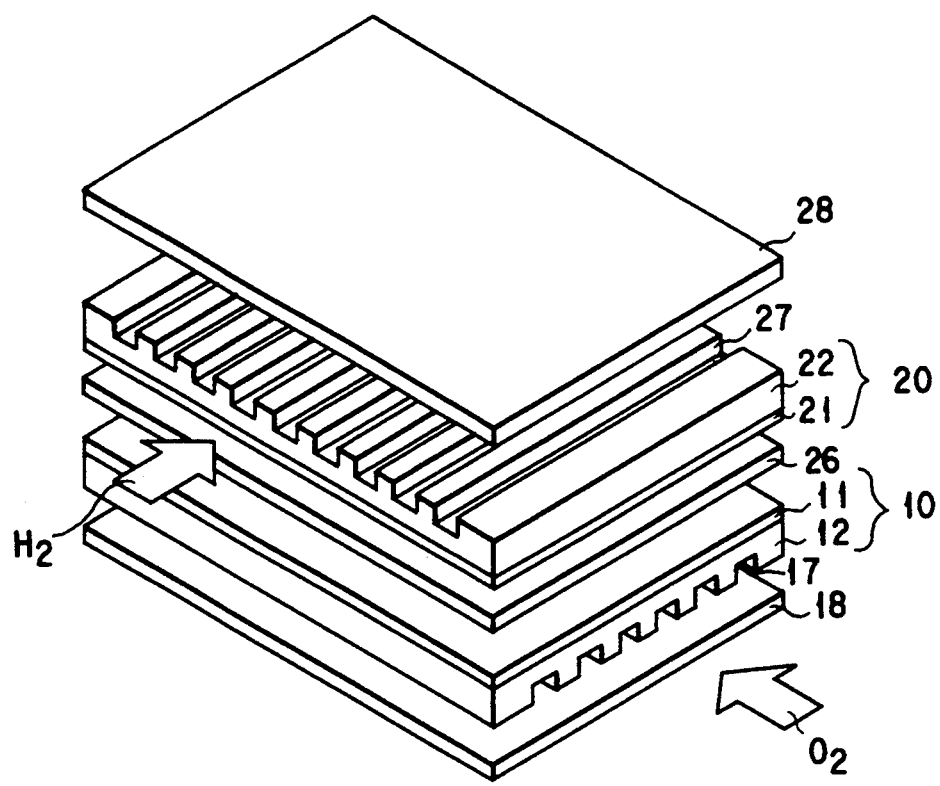
FIG. 3 is an exploded perspective view of a phosphoric acid fuel cell incorporating the electrode of the first embodiment.

FIG. 3 is an exploded perspective view of the phosphoric acid fuel cell incorporating the electrode of the first embodiment. This cell comprises a flat cathode electrode 10 and a flat anode electrode 20 which are arranged to oppose each other through an electrolyte layer 26. In the phosphoric acid fuel cell, oxygen reacts at the cathode electrode 10, and hydrogen reacts at the anode electrode 20. The electrode 10 (20) has a two-layered structure consisting of a catalyst layer 11 (21) and a diffusion layer 12 (22). Separators 18 and 28 comprising dense carbon plates are formed on the outer surfaces of the electrodes 10 and 20, respectively. A plurality of grooves 17 and a plurality of grooves 27 are formed in that surfaces of the diffusion layers 12 and 22, respectively, which face in a reverse direction to the electrolyte layer 26, thereby forming gas passages between the diffusion layer 12 and the separator 18 and between the diffusion layer 22 and the separator 28.

Figure 4:
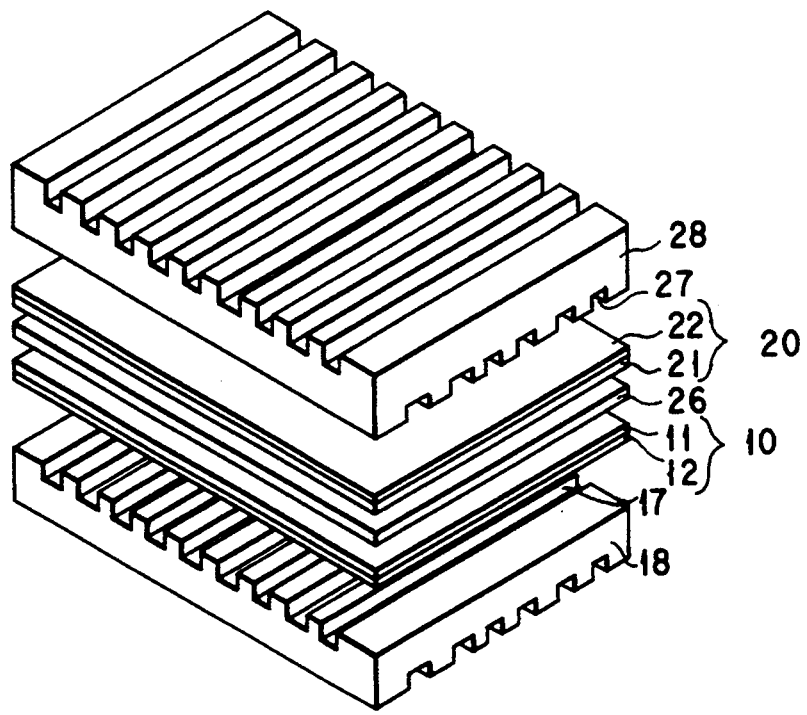
FIG. 4 is an exploded perspective view of a modification of the phosphoric acid fuel cell shown in FIG. 3.

FIG. 4 is an exploded perspective view of a modification of the phosphoric acid fuel cell shown in FIG. 3. This cell comprises the pair of electrodes 10 and 20 arranged to oppose each other through the electrolyte layer 26, and the pair of separators 18 and 28. The electrode 10 (20) comprises the catalyst layer 11 (21) and the diffusion layer 12 (22) as in the cell shown in FIG. 3. However, in this modification, the grooves 17 and 27 for forming the gas passages are not formed in the diffusion layers 12 and 22, but in the separators 18 and 28.

In the embodiment shown in FIG. 1, the catalyst layer 11 comprises a porous layer having a thickness of about 0.1 mm (100 $\mu$m). The diffusion layer 12 comprises a porous layer having a thickness of about 1.6 mm. The thickness of the catalyst layer 11 preferably falls within the range of 0.05 to 0.5 mm (50 to 500 $\mu$m), and more preferably 0.05 to 0.3 mm.

Figure 5:
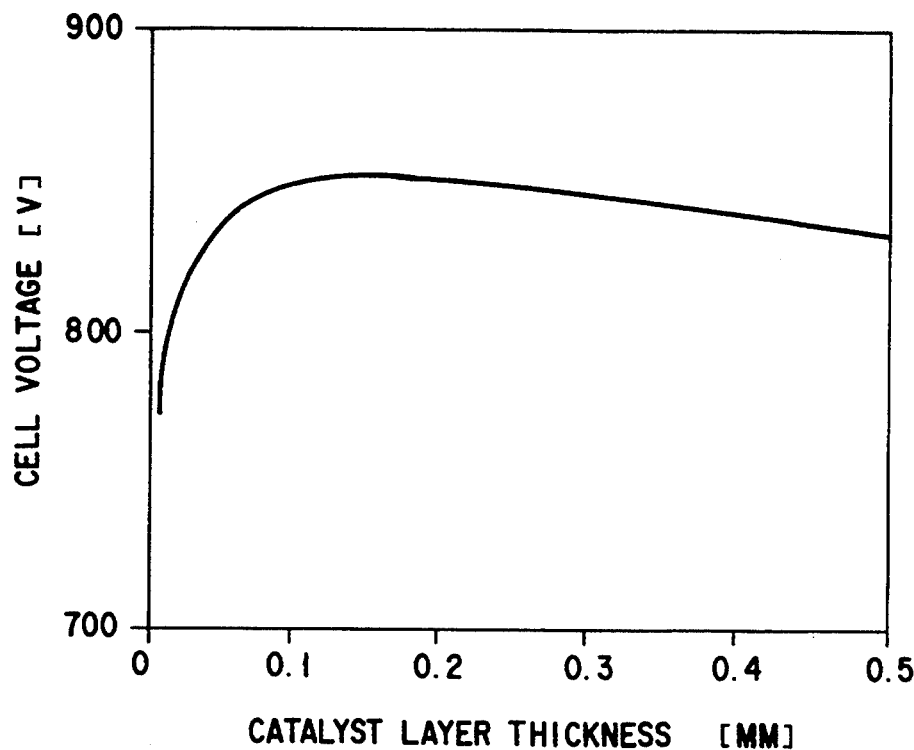
FIG. 5 is a graph showing the results obtained by calculating the relationship between the catalyst layer thickness and the fuel cell performance.

FIG. 5 is a graph showing the results obtained by calculating the relationship between the thickness of the catalyst layer 11 and the fuel cell performance. As shown in FIG. 5, it is apparent that the cell output is greatly lowered when the thickness of the catalyst layer 11 is less than 0.05 mm, while the cell output does not increase if the thickness of the catalyst layer 11 exceeds a certain value. In other words, the cell output is lowered when the thickness of the catalyst layer 11 is less or greater than an optimum thickness range of the catalyst layer 11 wherein the cell output has a peak. As shown in FIG. 3, when the grooves 17 are to be formed in the diffusion layer 12 itself, the thickness of the diffusion layer 12 preferably falls within the range of 1 to 2 mm. Alternatively, as shown in FIG. 4, when the grooves 17 are to be formed in the separator 18, the thickness of the diffusion layer 12 preferably falls within the range of 0.1 to 1 mm.

The catalyst layer 11 mainly comprises a conductive porous body whose skeleton consists of carbon as the major component and a small amount of dispersed polytetrafluoroethylene (PTFE). More specifically, unlike a conventional electrode catalyst layer, the catalyst layer 11 is constituted by a large number of agglomerate portions 13 and a large number of gap portions 14 which are alternately and almost parallelly arranged in the form of stripes. The width of each stripe of both the portions 13 and 14 is a few $\mu$m, preferably about 1 $\mu$m. Each stripe extends in a direction perpendicular to the drawing surface of FIG. 1. Note that the agglomerate portion 13 represents an agglomerate formed by holding an electrolyte in the conductive porous body and the gap portion 14 represents a portion connecting two adjacent agglomerate portions 13 by fibers of polytetrafluoroethylene (PTFE) and being essentially free from the electrolyte.

The agglomerate portion 13 has a porous lump or body wherein fine carbon powder particles on which an alloy catalyst containing platinum as a major component is dispersed and carried are combined to each other. The pores of the agglomerate portion 13 substantially communicate with each other. PTFE particles each having a diameter of about 0.3 $\mu$m are very sparsely present inside the porous body or lump, and the porous body is less water-repellent. For this reason, during an operation, most of the spaces, i.e., pores between the fine carbon powder particles of the agglomerate portion are filled with the electrolyte, and consequently the electrolyte serves to bind the fine carbon powder particles together. The envelopes of the outer surfaces of the agglomerate portions 13 are substantially linear in the direction of thickness of the electrode. In a state wherein the electrolyte is removed from the agglomerate portions 13, the agglomerate portions 13 have a porosity of 50% or more. In this embodiment, the agglomerate portions 13 have a porosity of 55 to 75%.

The gap portions 14 are formed to be porous by a large number of PTFE fibers 15 connecting the agglomerate portions 13 to each other. In this embodiment, the diameters of the PTFE fibers 15 fall within the range of about 0.05 $\mu$m to 0.2 $\mu$m. The diameter of each PTFE fiber 15 may be larger than about 0.2 $\mu$m if it satisfies other various conditions. Most of the PTFE fibers 15 extend into the agglomerate portions 13 and combined with the body of the agglomerate portion 13. However, the PTFE fibers in the adjacent gap portions 14 are mostly kept separated from each other and extend into different portions of the agglomerate portion 13 to constitute the skeleton of the catalyst layer 11. The gap portions 14 have a porosity of 20% or more. In this embodiment, the gap portions 14 have a porosity of 60 to 90%.

The fibers 15 must have repellency with respect to the electrolyte and/or water under operating conditions. From this point of view, the fibers 15 preferably consist of a compound having a covalent bond of fluorine and carbon.

The diffusion layer 12 consists of carbon paper having a substantially uniform fiber distribution. The diffusion layer 12 has a porosity of about 70%.

Figure 6:
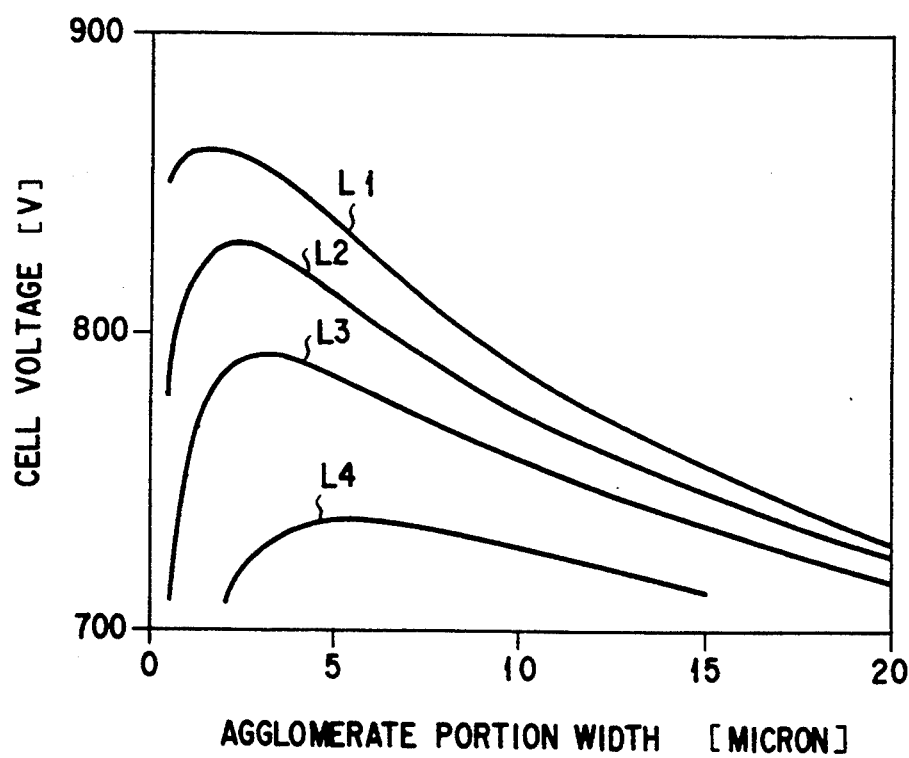
FIG. 6 is a graph showing the results obtained by calculating the relationship between the widths of agglomerate and gap portions and the fuel cell performance.

FIG. 6 is a graph showing the results obtained by calculating the relationship between the fuel cell performance and the widths of the agglomerate and gap portions 13 and 14. Reference symbols L1, L2, L3, and L4 in FIG. 6 denote the widths of the gap portions 14, i.e., the distances between the agglomerate portions 13 which are 1 $\mu$m, 5 $\mu$m, 10 $\mu$m, and 20 $\mu$m, respectively. As shown in FIG. 6, the gap portion 14 preferably has a narrow width and is desirably set to have a width of 10 $\mu$m or less. Note that a narrower width of the gap portion 14 causes an increase in gas diffusion resistance and at the same causes the outer surfaces of the agglomerate portions 13 to communicate with each other through the electrolyte and/or water as a reaction product, thereby clogging the gap portions 14. Therefore, the width of the gap portion 14 is preferably set to 0.5 $\mu$m or more.

As shown in FIG. 6, the width of the agglomerate portion 13 has an optimal range, which varies depending on other factors such as the width of the gap portion 14. To obtain satisfactory performance, the width of the agglomerate portion 13 is preferably set to be 10 μm or less. As previously described, $O_2$ in the cathode or $H_2$ in the anode in accordance with formula (1) or (2) diffuses through the electrolyte from the outer surface of each agglomerate portion 13 into the inside thereof. Further, $H_2O$ in the cathode in accordance with formula (1) diffuses through the electrolyte from the inside of each agglomerate portion 13 to the outer surface thereof. Therefore, where the width of each agglomerate portion 13 is larger than the value set out above, the diffusion resistance of the gases and water increases to degrade the cell performance.

Figure 7:
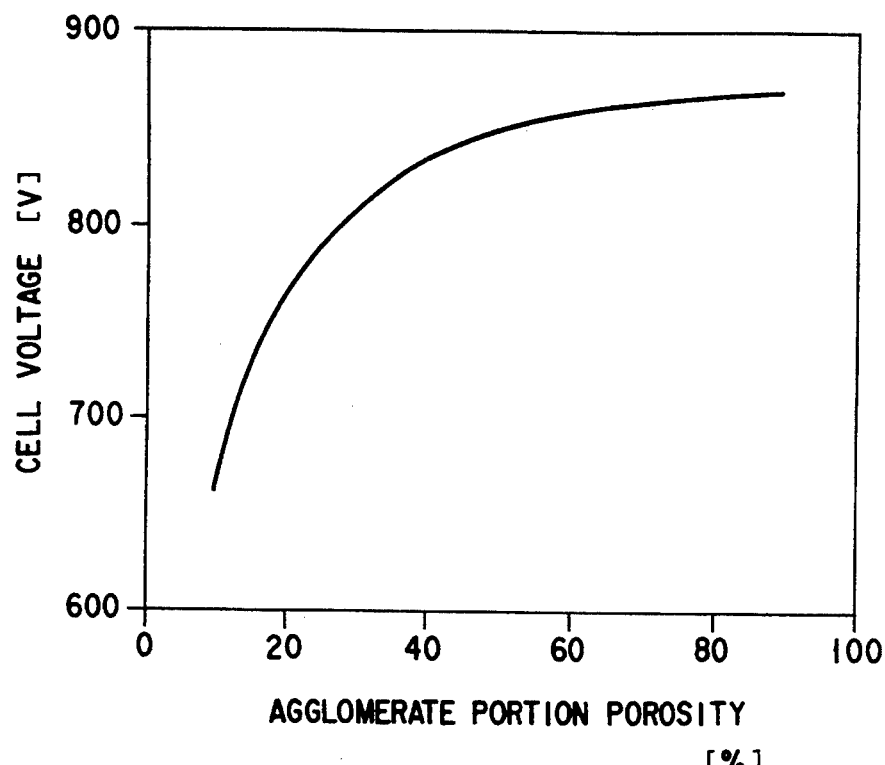
FIG. 7 is a graph showing the results obtained by calculating the relationship between the agglomerate portion porosity in a state wherein an electrolyte is removed and the fuel cell performance.

The optimal porosity of the agglomerate portions 13 from which the electrolyte is removed is determined by the electron conduction resistance of the fine carbon powder particles constituting the agglomerate portions 13 and the ionic conduction resistance of the electrolyte filled in the spaces between the fine carbon particles. In general, since the former resistance is lower than the latter resistance, a higher porosity is preferred. FIG. 7 is a graph showing the results obtained by calculating the relationship between the porosity of the agglomerate portions 13 in a state wherein the electrolyte is removed and the fuel cell performance. As shown in FIG. 7, to obtain satisfactory performance, the porosity of the agglomerate portions 13 free from the electrolyte is preferably set to 50% or more.

Figure 8:
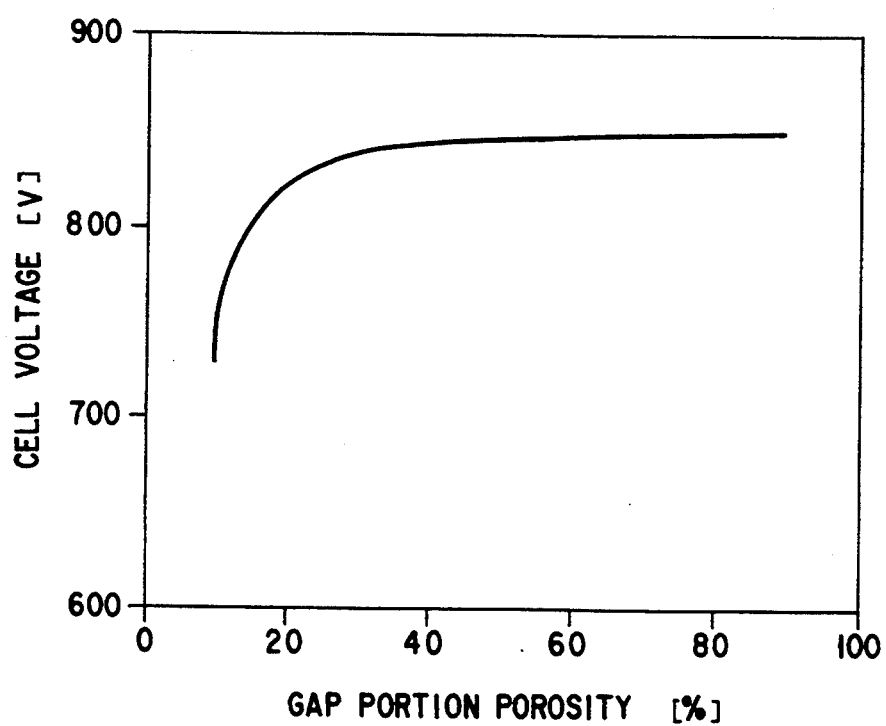
FIG. 8 is a graph showing the results obtained by calculating the relationship between the gap portion porosity and the fuel cell performance.

FIG. 8 is a graph showing the results obtained by calculating the relationship between the/porosity of the gap portions 14 and the fuel cell performance. As shown in FIG. 8, when the porosity of the gap portions 14 becomes less than 20%, and particularly less than 10%, the output degradation of the fuel cell becomes typical due to an increase in gas diffusion resistance. To obtain satisfactory performance, the porosity of the gap portions 14 is preferably set to 20% or more.

The catalyst layer 11 shown in FIG. 1 can be prepared by, e.g., the following method. The process performed in an actual experiment will be described below.

A liquid containing dispersed polytetrafluoroethylene (PTFE) was mixed in a solution obtained by mixing a binder, a solvent, and fine carbon powder particles on which an alloy catalyst mainly containing platinum was dispersed and carried. The resultant mixture was dried. In this case, the weight ratio of the fine carbon powder particles on which the catalyst is dispersed and carried to the PTFE was 10:1.

An intermediate product upon drying is compressed and stretched to prepare a sheet element. A plurality of such sheet elements were stacked, compressed, and worked with a roller to form a sheet. A uniaxial tension was applied to the resultant sheet to obtain a 100-μm thick sheet, i.e., a catalyst layer 11. The sheet-like catalyst layer 11 was adhered to the surface of a 1.6-mm thick diffusion layer consisting of carbon fibers. The resultant structure was heat-treated at about 200° to 300° C. for an hour to obtain an electrode 10.

As the above binder, an acrylic resin-based binder, polyvinyl alcohol, polyvinyl butyral, paraffin, or a cellulose-based binder were tried. As the above solvent, xylene, toluene, cyclohexane, butanol, acetone, methyl ethyl ketone, kerosine or water were tried. In view of dispersion properties, adhesion strength, remaining amount upon volatilization, and the like, a combination of an acrylic resin-based binder and xylene was used in this embodiment.

In stacking the roller-worked sheet elements, they were aligned in the compression-stretched direction, i.e., in the pulling direction from the roller in one case. In other case, the sheet elements were stacked so that their stretched directions were perpendicular to each other. In view of formability, sheet elements were stacked so that their stretched directions were perpendicular to each other in this embodiment.

As a method of applying a unidirectional tension to the sheet, this embodiment employed a method in which the sheet was brought into contact with the end face of a plate-like 100-Hz vibrator having a width of 20 cm which was slightly larger than the width of the sheet, and the sheet was slowly moved to shift the position where the sheet was in contact with the vibrator. As any other method, a method of holding the front and rear ends of the sheet with clamps and pulling them, a method of clamping the sheet with front and rear pairs of rollers and changing the rotational speeds of the front and rear pairs of rollers, or the like can be used.

The structure of the catalyst layer 11 shown in FIG. 1 can be obtained by the method using the vibrator due to the following reason.

In general, when a tension is applied to a polymer sheet, fine cracks called crazes containing thin fibers called fibrils, which extend parallel to the direction of tensile stress, are known to be formed inside the sheet at a predetermined stress or more. The details of this mechanism are unknown, but crazes are experimentally known to be easily formed at a lighter stress with a higher distortion rate. This embodiment is different form the experimental care in that a sheet obtained by mixing a polymer and a fine carbon powder is used in this embodiment. It is, however, estimated that the stripe-like crazes having a very small size, i.e., the gap portions 14 are formed by a similar mechanism with a very high distortion rate caused by the vibrator.

The resultant electrode 10 was used as a cathode electrode to form a phosphoric acid fuel cell, and a power generation experiment was performed. In this experiment, as shown in FIG. 2, a matrix layer 26 having a thickness of about 100 μm and containing silicon carbide having a porosity of about 50% was applied to the surface of the catalyst layer 11. In addition, an anode electrode having a thickness of about 1.7 mm and consisting of a catalyst layer 21 and a diffusion layer 22 and a diffusion layer 22 formed in the same manner as the electrode 10 was adhered to the opposite surface of the matrix layer 26. In this case, the matrix layer 26 and the catalyst and diffusion layers 21 and 22 of the anode electrode were impregnated with an aqueous phosphoric acid solution serving as an electrolyte in a predetermined amount in advance, so that this catalyst was contained in the pores of the agglomerate portions 13 of the catalyst layer 11 of the cathode electrode 10 upon assembly.

A fuel cell consisting of the layers 11 to 26 formed as described above was set in a holder 32 such that hydrogen was supplied to the anode electrode side and air was supplied to the cathode electrode side. A voltmeter 34 was connected between the anode and cathode electrodes of the finished phosphoric acid fuel cell, and the power generation characteristics were examined.

Figure 9:
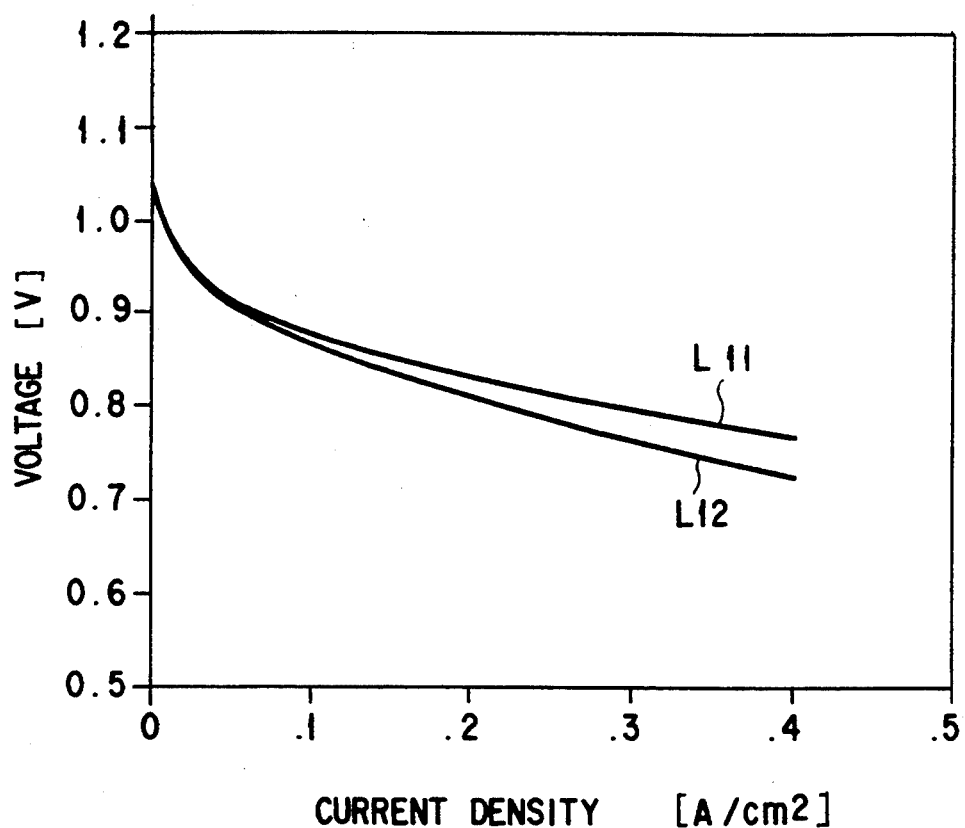
FIG. 9 is a graph showing the current-voltage characteristics of a conventional fuel cell and the fuel cell using the electrode of the first embodiment of the present invention.

FIG. 9 shows, as a result of the above experiment, a current-voltage characteristic curve L11 of the phosphoric acid fuel cell using the electrode 10 of the present invention and a current-voltage characteristic curve L12 of the conventional phosphoric acid fuel cell in which the platinum filling amount per unit area is equal to that of the cell of the present invention. Both the fuel cells were operated at about 8.4 atm. and about 205° C. with a utilization ratio of 70%. As can be apparent from FIG. 9, a decrease in voltage of the phosphoric acid fuel cell of the present invention with an increase in current was more moderate than that of the conventional phosphoric acid fuel cell. At 400 mA/cm$^2$, the voltage of the phosphoric acid fuel cell of the present invention was 0.77 V which was higher than the phosphoric acid fuel cell of the conventional structure by 40 mV. The output density of the phosphoric acid fuel cell of the present invention was 0.30 W/cm$^2$.

Upon the power generation experiment, the electrode 10 was observed with an electron microscope and energy dispersion type X-ray analyzer. The fibers 15 in the gap portions 14 were kept in a good condition, and ingress of the liquid electrolyte was rarely observed. In addition, a large amount of phosphorus was uniformly detected inside the agglomerate portions 13, and it is assumed that the agglomerate portions 13 were sufficiently impregnated with the liquid electrolyte during the operation.

Figure 10:
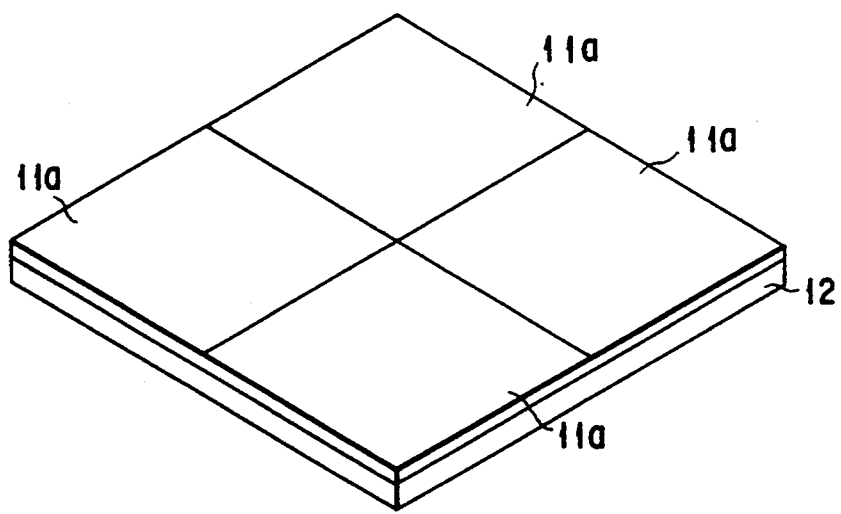
FIG. 10 is a perspective view showing an electrode according to the second embodiment of the present invention.

As an electrode according to the second embodiment of the present invention, an electrode using a catalyst layer divided into a plurality of parts on a plane was used due to the following reason. In a large electrode in practical use, if small catalyst layer sheets can be arranged next to each other, the manufacturing apparatus can be made compact, and the manufacturing cost can be reduced. To examine the performance of an electrode having such an arrangement, the following two electrode samples were prepared. One of which was an electrode sample obtained by arranging four square catalyst layer segment sheets 11a each having a side of 5 cm on a square diffusion layer 12 having a side of 10 cm so as to form a 2×2 matrix, as shown in FIG. 10. The other was an electrode sample obtained by arranging one square catalyst layer sheet having a side of 10 cm on a square diffusion layer 12 having a side of 10 cm. Phosphoric acid fuel cells using these samples were formed following the same procedures as described above, and the power generation characteristics of the resultant fuel cells were examined. It was found that the power generation characteristics of these samples were almost equal to each other.

As an electrode according to the third embodiment of the present invention, a catalyst layer having the same structure as in the first embodiment except that a Nafion (tradename available from DuPont) as an ion-exchange resin was used in place of the binder of the first embodiment was prepared. In this case, the width of each gap portion was set to about 4 μm. The heat treatment was performed at 120° C. for an hour. Note that Nafion as the ion-exchange resin serves as an electrolyte of a solid polymer contained in the agglomerate portions 13.

It is possible to use the electrode of the present invention to form cathode and anode electrodes, and to use a Nafion film serving as an electrolyte layer sandwiched between these electrodes to prepare a solid polymer electrolyte fuel cell.

The present invention has been applied to a phosphoric acid fuel cell and a solid polymer electrolyte fuel cell. However, the present invention is not limited to this. The present invention is also applicable to the electrode of a cell of a different type, a primary cell or a secondary cell. The present invention is further applicable to electrodes of various electrochemical reaction apparatuses for performing reactions in which reactants and/or reaction products contain gases. These electrodes can be exemplified by an electrode for electrolysis, a sensor electrode, and the like.

As described above, according to a fuel cell using an electrode of the present invention, a higher output density than that in a conventional fuel cell can be obtained with the same amount of catalyst.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An electrode to be used in an electrochemical reaction while being arranged between a gas passage for flowing a gas as a reactant and an electrolyte layer containing an electrolyte, comprising:
   a diffusion layer comprising a conductive porous body in contact with the gas passage, for flowing the gas from the gas passage along a direction of thickness of said electrode; and
   a catalyst layer arranged between said diffusion layer and said electrolyte layer and in contact therewith;
   wherein said catalyst layer comprises
      a plurality of agglomerate portions each comprising a conductive porous body which extends in the direction of thickness of said electrode and has pores containing an electrolyte; and
      a plurality of gap portions arranged alternately with said agglomerate portions, each gap portion defining a bore extending through said catalyst layer in the direction of thickness of said electrode, and including in the bore a plurality of liquid-repellent fibers which connect two adjacent agglomerate portions.

2. The electrode according to claim 1, wherein said agglomerate portions and said gap portions are alternately arranged in a stripe-like manner.

3. The electrode according to claim 1, wherein said porous body of said agglomerate portion essentially consists of a lump of fine carbon powder particles on which a catalyst is dispersed and carried.

4. The electrode according to claim 1, wherein said fibers essentially consist of a compound having a covalent bond of fluorine and carbon.

5. The electrode according to claim 1, wherein said agglomerate portions have a porosity of not less than 50% upon condition that said electrolyte is removed.

6. The electrode according to claim 1, wherein said gap portions have a porosity of not less than 20%.

7. The electrode according to claim 1, wherein said catalyst layer comprises a plurality of segments divided on a plane, said segments being arranged next to each other on said diffusion layer.

8. The electrode according to claim 1, wherein said electrolyte has a solid phase.

9. A fuel cell in which an electrochemical reaction of a gas as a reactant is used, comprising:
   (a) an electrolyte layer containing an electrolyte;
   (b) cathode and anode electrodes facing each other via said electrolyte layer, one of said electrodes comprising
      a diffusion layer comprising a conductive porous body in contact with the gas passage, for flowing the gas from the gas passage along a direction of thickness of said electrode, and a catalyst layer arranged between said diffusion layer and said electrolyte layer and in contact therewith, wherein said catalyst layer comprises a plurality of agglomerate portions each comprising a conductive porous body which extends in the direction of thickness of said electrode and has pores containing an electrolyte, and a plurality of gap portions arranged alternately with said agglomerate portions, each gap portion defining a bore extending through said catalyst layer in the direction of thickness of said electrode, and including in the bore a plurality of liquid-repellent fibers which connect two adjacent agglomerate portions; and (c) a gas passage arranged in contact with said one of the electrodes for flowing the gas.

10. The cell according to claim 9, further comprising a separator which faces said electrolyte layer via said one of the electrodes, and wherein said gas passage is formed between said one of the electrodes and said separator.

11. The cell according to claim 9, wherein said agglomerate portions and said gap portions are alternately arranged in a stripe-like manner.

12. The cell according to claim 9, wherein said porous body of said agglomerate portion essentially consists of a lump of fine carbon powder particles on which a catalyst is dispersed and carried.

13. The cell according to claim 9, wherein said fibers essentially consist of a compound having a covalent bond of fluorine and carbon.

14. The cell according to claim 9, wherein said agglomerate portions have a porosity of not less than 50% upon condition that said electrolyte is removed.

15. The cell according to claim 9, wherein said gap portions have a porosity of not less than 20%.

16. The cell according to claim 9, wherein said catalyst layer comprises a plurality of segments divided on a plane, said segments being arranged next to each other on said diffusion layer.

17. The cell according to claim 9, wherein said electrolyte has a solid phase.

* * * * *